Patented Nov. 19, 1940

2,222,344

UNITED STATES PATENT OFFICE 2,222,344

PROCESS FOR PREPARING BETA-INDOLYL ACETIC ACIDS

Karl Bauer and Hans Andersag, Wuppertal-Elberfeld, Germany, assignors to Winthrop Chemical Company, Inc., New York, N. Y., a corporation of New York No Drawing. Application June 1, 1939, Serial No. 276,805. In Germany August 4, 1937

4 Claims. (Cl. 260—319)

This invention relates to a new process for preparing β-indolyl acetic acids.

Several methods for preparing β-indolyl acetic acids are known. One of them consists in introducing substituted alkyl residues in the β-position of indole and its substitution products by means of Grignard compounds. Another of them consists in introducing an acetic residue by means of diazo acetic acid esters (see U. S. Patent 2,079,416). Carrying out these methods on a technical scale is, however, very difficult in view of the special nature of the reactants used.

The process according to the invention enables the preparation of β-indolyl acetic acid on a technical scale in a very simple manner by reacting an indole which is unsubstituted in the β-position to the nitrogen atom with formaldehyde and a watersoluble non-complex salt of hydrocyanic acid and saponifying the β-indolyl acetic acid nitrile formed into the corresponding carboxylic acid by treatment with an alkali and acidification of the salt to yield the free acid. By the addition of saponifying agents to the reaction mixture it is possible to obtain directly the β-indolyl acetic acids in a one-step process.

The term "an indole" whenever used in the specification and the appended claims is—if not otherwise stated—intended to comprise the unsubstituted indole of the formula

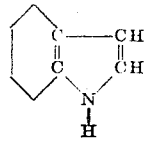

as well as its substitution products. In the latter products the substituent may be present in the benzene—and/or pyrrole-nucleus. The β-position with regard to the nitrogen atom is, however, to be unsubstituted.

The said substituted indoles may contain as a substituent in the benzene nucleus for instance alkyl groups such as methyl-, ethyl- or propyl-radicals as well as halogen atoms such as chlorine or bromine atoms. Also alkoxy- or aryl-groups such as the methoxy-; ethoxy- or phenyl-group may be present. The substituents in 4- and 5-position may form a ring system such as in the case of naphthindole.

As substituent in the pyrrole ring system (in α-position to the nitrogen atom) alkyl-, aralkyl- or aryl-groups may for instance be cited. Such groups may be substituted for instance by hydroxyl- or ether-groups. Suitable substituents are for instance methyl-, ethyl-, n-butyl-, benzyl- phenyl-, methoxy-, hydroxy ethyl radicals or also halogen atoms.

Also the nitrogen atom may bear a substituent such, for instance, as an alkyl- or aryl-group.

Advantageously the substituent or substituents eventually present in the pyrrole and/or benzene ring system are of no appreciable chemical activity in order to avoid any undesired by-reactions with the cyanide and/or formaldehyde. Such substituents are particularly hydrocarbon residues.

For practical reasons we prefer starting with unsubstituted indole. Suitable substituted indoles of the kind aforedescribed are for instance 2.5-dimethylindole, 2.5-diethylindole, α-methylindole, α-phenylindole, N-methylindole, naphthindole, 6-chloroindole, N-ethylindole, N-phenylindole, α-ethylindole, α-butylindole, α-tolylindole, α-methoxy-phenylindole, and 6-bromoindole.

Instead of formaldehyde also its polymers such as the para-formaldehyde may be used.

As watersoluble cyanides there come particularly into consideration the alkali and alkali earth metal salts of hydrocyanic acid such as potassium cyanide, sodium cyanide, calcium cyanide and barium cyanide.

In order to effect the condensation of the indole with formaldehyde and the watersoluble cyanide it is not necessary to use the reactants in an exactly defined ratio. In general, we prefer using the indole in a quantity less than stoichiometrically required; for instance, we have found advantageous to react 1 mol of the indole with 1½ mols of formaldehyde and 1½ mols of the watersoluble cyanide. As stated above the saponification of the β-indolyl acetic acid nitrile may be effected in the reaction mixture resulting from the condensation. It is, for instance, possible to add to the starting reaction mixture an alkali such as potassium hydroxide or sodium hydroxide. Also the water soluble cyanide which by hydrolysis displays an alkaline reaction, may be used in excess.

The reaction may be performed in the presence or in the absence of solvents or diluents. As a solvent or diluent for instance methanol, ethanol and butanol may be used. If the reaction is carried out in the presence of water advantageously a diluent is used which is miscible with water such as a lower aliphatic alcohol. If, however, no water is present, the reaction is preferably performed in a solution of a water-immiscible compound such, for instance, as a higher aliphatic alcohol.

It has proved particularly advantageous to carry out the condensation of the indole with formaldehyde and the water-soluble cyanide in the presence of an alcohol, preferably a lower alcohol such as methanol, ethanol or propanol. If the β-indolyl acetic acid nitrile formed by the reaction is water-insoluble an alcohol may also be present in the step of saponification of the nitrile.

The β-indolyl acetic acids obtained according to the process of the invention are intended to be used, for instance, as media for promoting the growth of plants.

The following examples illustrate the invention without, however, restricting it thereto, the parts being by weight:

Example 1

100 parts of formaldehyde (30 per cent) are mixed with a solution of 65 parts of potassium cyanide in 100 parts of water while cooling with ice-water (strong heat of reaction). A solution of 117 parts of indole in 300 parts of alcohol is added to this mixture which is heated to a temperature of 150° for 4 hours in the autoclave (9–10 atm.). After cooling the alcohol is distilled off. Unchanged indole and polymerisation products are removed by twice extracting the mixture with ether. The aqueous solution extracted with ether is mixed with diluted sulfuric acid (evolution of hydrocyanic acid). The precipitate formed is washed with water, dried, dissolved in 250 parts of anhydrous alcohol whereupon the solution is filtered. To the alcoholic solution 30 parts of potassium hydroxide are added and the mixture is heated to boiling for a short time. This solution is mixed with anhydrous ether whereby silver-shining scales of the potassium salt of β-indolyl acetic acid precipitate. It is sucked off and carefully washed with anhydrous alcohol and ether. The potassium salts thus obtained yields when acidified the β-indolyl acetic acid of the melting point 167° C.

Example 2

If the reaction mixture described in Example 1 is heated to boiling for 12 hours while refluxing, the β-indolyl acetic acid nitrile boiling at 190° C. under 2 millimeter's pressure is obtained from the ethereal extract of the reaction mixture which has previously been freed from alcohol, after precipitating the unchanged indole. In order to saponify the nitrile 12 parts of it are boiled for 6 hours while refluxing with 80 parts of anhydrous alcohol, 2 parts of water and 10 parts of potassium hydroxide. The potassium salt is filtered off, washed with anhydrous alcohol and anhydrous ether.

The remaining aqueous solution (after the extraction with ether as mentioned above) is mixed with diluted sulfuric acid, and the precipitate is worked up as described in Example 1. After saponification with 10 parts of potassium hydroxide the potassium salt of the β-indolyl acetic acid is obtained.

Example 3

58 parts of indole are dissolved in 200 parts of n-butyl alcohol. The solution is heated to boiling after the addition of 45 parts of finely divided potassium cyanide while refluxing. Into the boiling mixture 60 parts of paraformaldehyde are introduced drop by drop. After boiling for some hours the butyl alcohol is removed by steam distillation and the remaining oil extracted with ether. The ether is evaporated and the residue fractionated. Thus the β-indolyl acetic acid nitrile of the boiling point 190–200° C. under 2 millimeter's pressure is obtained. It is saponified as described above.

Example 4

9 parts of potassium cyanide are dissolved in 11 parts of water whereupon 13 parts of 30 per cent formaldehyde are added on cooling with ice (temperature of the reaction mixture 15° C.). Thereupon the mixture is heated to 150° C. together with a solution of 10 parts of α-methyl indole in 50 parts of alcohol for 6 hours. After cooling the alcohol is distilled off by steam distillation; the non-transformed α-methyl indole is filtered off. The filtrate is acidified with hydrochloric acid and washed with ether. Thus, α-methyl-β-indole acetic acid is obtained. After recrystallisation from diluted alcohol it melts at 195° C.

If instead of α-methylindole α-phenylindole is used α-phenyl-β-indolyl acetic acid is obtained. After recrystallisation from a mixture of acetic acid ethyl ester and petroleum ether the substance melts at 174° C.

Example 5

9 parts of potassium cyanide in 11 parts of water are slowly added to 13 parts of 30 per cent formaldehyde while cooling, whereupon the mixture is heated to 150° C. with 12 parts of 2.5-dimethyl indole in 50 parts of alcohol for 6 hours in an autoclave. The alcohol is distilled off, and the non-transformed indole is removed by filtration. The filtrate is acidified with hydrochloric acid, washed with ether and the ether distilled off. The 2.5-dimethyl-3-indole acetic acid is recrystallised from acetic ester-petroleum ether (melting point 174° C.).

Example 6

64 parts of sodium cyanide dissolved in 100 parts of water are slowly added to 130 parts of 30 per cent formaldehyde while cooling. On the addition of 100 parts of indole in 400 parts of alcohol the mixture is heated in an autoclave for 5 hours to 150° C. The alcohol is distilled off and the non-transformed indole is removed by filtration. On acidifying the filtrate the β-indole acetic acid is obtained.

Instead of sodium cyanide also calcium cyanide may be used.

This application is a continuation-in-part application of our co-pending earlier application Serial No. 221,708, filed July 28, 1938.

We claim:

1. Process for preparing β-indolyl acetic acids comprising heating an indole which is unsubstituted in the β-position to the nitrogen atom with formaldehyde and a watersoluble non-complex salt of hydrocyanic acid to formation of a β-indolyl acetic acid nitrile, treatment of the nitrile with an alkali to form the corresponding salt and acidification to yield the free acid.

2. Process for preparing β-indolyl acetic acids comprising heating an indole which is unsubstituted in the β-position to the nitrogen atom with formaldehyde and a watersoluble non-complex salt of hydrocyanic acid to formation of a β-indolyl acetic acid nitrile, treatment of the nitrile with an alkali to form the corresponding salt and acidification to yield the free acid, at least the first step of the reaction being carried out in the presence of an aliphatic alcohol.

3. Process for preparing β-indole acetic acids comprising heating a compound selected from the group consisting of indole of the formula

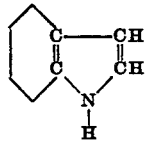

and its homologues with formaldehyde and a watersoluble non-complex salt of hydrocyanic acid to formation of a β-indolyl acetic acid nitrile, treatment of the nitrile with an alkali to form the corresponding salt and acidification to yield the free acid.

4. Process for preparing β-indole acetic acids comprising heating a compound selected from the group consisting of indole of the formula

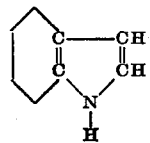

and its homologues with formaldehyde and a watersoluble non-complex salt of hydrocyanic acid to formation of a β-indolyl acetic acid nitrile, treatment of the nitrile with an alkali to form the corresponding salt and acidification to yield the free acid, at least the first step of the reaction being carried out in the presence of an aliphatic alcohol.

KARL BAUER.
HANS ANDERSAG.